United States Patent [19]

Vahlstrom et al.

[11] Patent Number: 4,538,223

[45] Date of Patent: Aug. 27, 1985

[54] COMPUTER OPERAND ADDRESS COMPUTATION

[75] Inventors: Richard Vahlstrom, Villa Park; Dennis R. Keats, Irvine, both of Calif.

[73] Assignee: Microdata Corporation, Irvine, Calif.

[21] Appl. No.: 427,830

[22] Filed: Sep. 29, 1982

[51] Int. Cl.³ .............................................. G06F 9/36
[52] U.S. Cl. .................................................... 364/200
[58] Field of Search ................................ 364/200, 900

[56] References Cited

U.S. PATENT DOCUMENTS

| | | | |
|---|---|---|---|
| 3,976,978 | 8/1976 | Patterson et al. | 364/200 |
| 4,124,891 | 11/1978 | Weller, III et al. | 364/200 |
| 4,439,828 | 3/1984 | Martin | 364/200 |

OTHER PUBLICATIONS

System Programming, John Donovan, 1972, pp. 25-29.
IBM System/360, Principles of Operations, 1964.

*Primary Examiner*—Thomas M. Heckler
*Attorney, Agent, or Firm*—Gregory A. Cone; George W. Finch; Donald L. Royer

[57] ABSTRACT

The address of an operand in computer main memory is computed by a system which utilizes a base memory frame address in combination with a displacement value, indicative of the position in the frame of the operand relative to the base memory frame address, and information relating to the length of the operand to supply system hardware with the necessary information to enable a fetch of the operand from main memory. This system has the capability to compute addresses for multi-byte word operands within a single firmware clock cycle.

5 Claims, 8 Drawing Figures

COMPUTER OPERAND ADDRESS COMPUTATION

BACKGROUND OF THE INVENTION

This invention relates to computer address computation operations. More particularly, this invention relates to address computations which are needed to support the fetching of individual operands, which may range in length up to multi-byte, from main memory.

There exists any number of different methods for storing and transferring information into and out of computer memory. However, in larger business-oriented systems it is quite common to employ hard disk memories for the bulk of the stored information in combination with the electronic main memory resident within the computer itself. Information is normally initially entered onto the hard disk, and it is identified by a virtual address which consists of a frame identification (FID) and a displacement within the identified frame. This FID plus a displacement uniquely define a virtual address for each block of information on the hard disk. However, in order to be useful to the CPU of the computer system, the information must be read into the high-speed main memory of the computer system, which is normally done by an internal management function which assigns the information blocks to available positions within the main memory. These main memory positions must also be defined and identified in order that the information can be used by the CPU, and to this end means must be provided to uniquely identify these information blocks within the main memory.

SUMMARY OF THE INVENTION

The address computation system of this invention is used whenever an operand is fetched from main memory. It is used to compute the operand address in a single firmware clock cycle. In general, the computer address consists of a sum of three basic components:

A. Content of a selected address register file location which points to a main memory frame.

B. Displacement factor.

C. Added constant.

These components may be directly specified in the software instructions being processed by the CPU, or they may be implied in the software instructions, or they may be specified in the CPU as firmware routines.

For example, the software instruction may contain the following fields:

R1, DISP 1, KK (word length)

R1 designates the address register file location, DISP1 specifies the displacement factor, and KK (word length) specifies whether the displacement factor is used directly, or multiplied by 2.

In another case, the software instruction may refer to the accumulator, or to an address register (both in memory). In this case, the address is implied. Therefore, the CPU firmware must supply the parameters, in accordance with the software instruction.

In a third case, the CPU firmware may be doing a long operation, or a background operation, in which case the firmware has complete control of designation of the address computation parameters.

The address computation system is designed to efficiently support all three cases.

This address is then used to fetch the operand from memory, so that it can be used by the CPU on a subsequent clock cycle.

DETAILED DESCRIPTION OF THE INVENTION

The address computation system of this invention was developed as a subsystem of the SEQUEL ™ computer system recently introduced by Microdata Corporation, Irvine, Calif.

The SEQUEL system is a large business computer system which is designed around the use of 32-bit (4 byte) data words and the use of data and instructions which range in length from 1 to 6 bytes plus the use of indefinitely long data strings.

The remarks that follow will describe the implementation of the address computation system within the context of the SEQUEL system.

However, it should be realized that other embodiments of the basic invention are possible, and that the true scope of the invention is defined by the appended claims.

For each user on the system, there are 16 address registers which are used to point to data or instructions. These registers are set up (or loaded) by software in their virtual form. That is, they contain a FID and a displacement. Before the CPU can address this frame, two things are required.

1. The frame must be moved from disc into a main memory location.

2. The virtual address (FID plus displacement) must be converted into the main memory address. This step is called register attachment.

When the register is attached, the resulting 24 bit main memory address is placed into the appropriate address register file where it is used by the address computation logic to make the determination of the specific address within the main memory frame. In order to minimize CPU processing time, it is highly desirable to do an address computation operation in one firmware clock cycle.

The address computation logic has been designed so that all inputs required can be directly input to the computation unit and the computation can be done in one firmware clock for all of the many forms of address computation which are required.

In the SEQUEL system the management of the main memory resource centers on the principle of keeping in main memory only the information that is needed immediately. When the information is not needed, the information is stored on hard disks. Information is moved back and forth between disk and main memory in "packets" that consist of 512 bytes referenced by a frame address (FID). A specific information block is referenced by a displacement within a partiuclar frame. When a frame is moved from disk to main memory, it is placed in whatever frame space is available in main memory. Once in memory, a block of information in a frame must now be referenced by both its displacement and the location of the frame in the main memory; that is, its location in the frame with respect to the main memory address of the first byte of the frame. It is, therefore, a function of the address computation circuits of this invention to provide an absolute main memory address.

Figure 1:
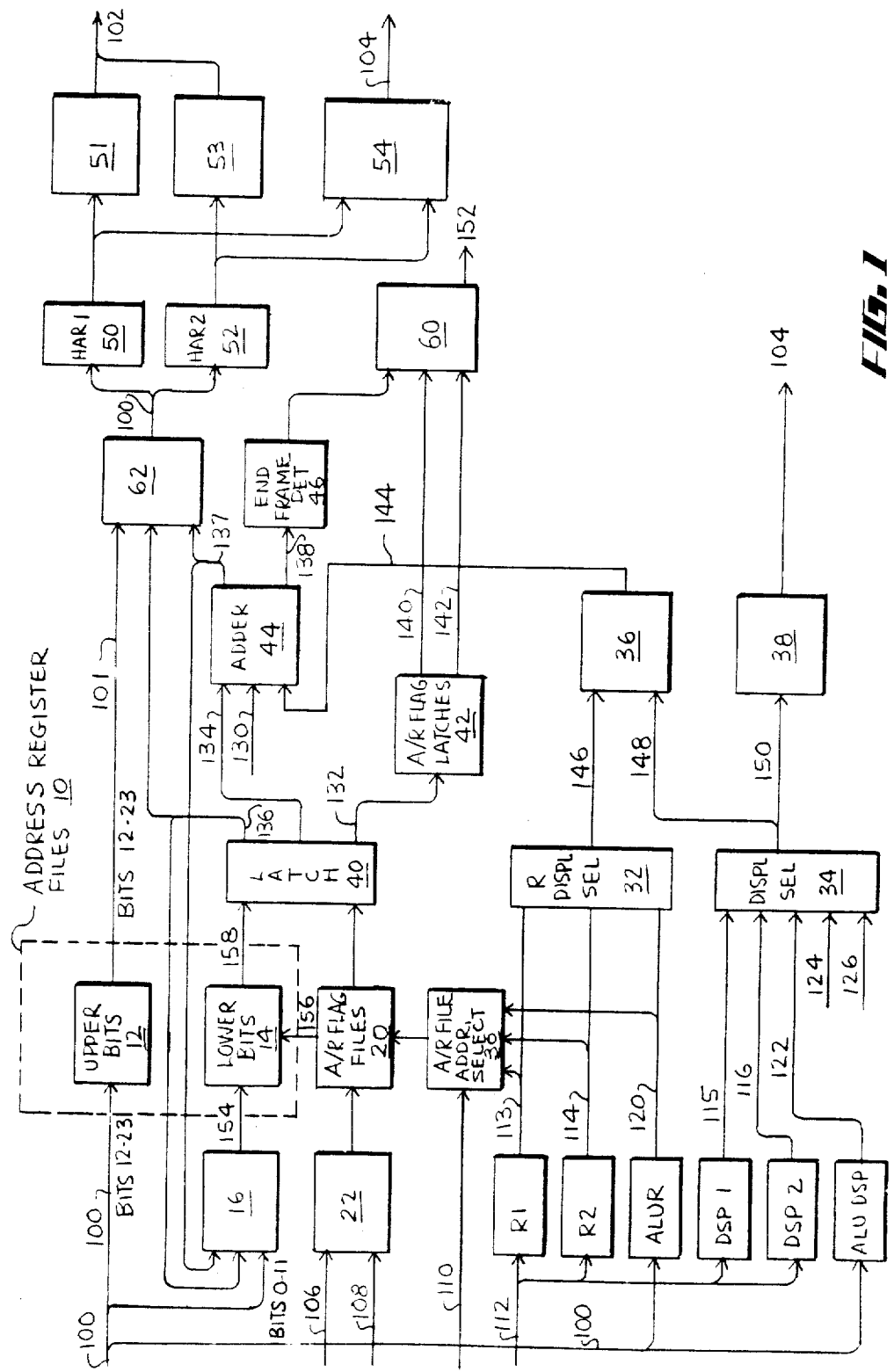
FIG. 1 is a detailed block diagram showing the functional units of one embodiment of this invention.

The following remarks and explanations will be referenced to the drawing FIG. 1. The address register files 10 are located in a 24-bit wide by 16-register deep memory for storing base addresses (a base address is a main memory address). The first register in the address register file (AR0) always contains the base address for the current program's program control block in the SEQUEL system. The second register in the file (AR1) always contains the base address of the current program frame. The remaining registers are not specifically dedicated. The address register file can be loaded by the CPU or from the result of an address computation operation over lines 100 or 137 respectively via the lower address register files source select block 16. When the address register is loaded, bits 0–11 of the input (base addresses) to the address register file are supplied by either the CPU bus 100 or from the output of the address computation process 137. Bits 12–23 are always supplied by the CPU bus via the upper branch of input line 100. Therefore, bits 12–23 are never updated by an address computation operation in the SEQUEL system.

The selection of a particular one of the 16 base addresses in the address register files 10 is controlled by 3 bits of the firmware command instruction word latched into the instruction register, not shown. These bits select one of three 4-bit registers that in turn contain an address of an address register file register found in block 30, which in turn contains the particular 24-bit main memory base address which is sought. These three 4-bit registers are labelled in the drawing as R1, R2, and ALUR. The R1 and R2 4-bit registers are loaded via input line 112 which orginates from a separate subsystem of the SEQUEL system called the read next instructon system.

The third of the three 4-bit registers is labelled ALUR and is loaded via line 100 which is the CPU destination bus. Data along line 100, the CPU destination bus, orginates in the ALU. R1 and R2 are the most often used sources, while ALUR is provided as an address source so that instructions that implicitly reference an address register file register can be handled by the system. Whichever source is selected, the 4-bit address is then used to address (select one of the 16 locations) the address register file 10. The 24-bit address register file output is split into three parts, the lower 9 bits (0–8) are latched and input to the adder (for addition to the displacement). Bits 9–11 are latched but not input to the adder. (This is a hardware design convenience.) Bits 12–23 are not latched. Since address computation operates only within a frame, only 9 lower bits are ever modified by the address computation. The upper bits (9–23) are modified only by the CPU, by loading values into the A/R file. The selected address register file address on its way to the address register input/output control circuits is intercepted by a group of circuits that allow this address to be forced to 0. This force-to-0 command is input over line 110 into the address register file address select block 30. This is used to access the base address in address register 0 of the current program's program control block. This force-to-0 function is commanded by one of the three command bits of the firmware word discussed above.

Locating an operand in main memory requires both the base address of the frame in which it resides and its relative position, displacement, in the frame. Obtaining this displacement is controlled by three more bits in the command firmware word latched into the instruction register. These bits select one of three 8-bit registers that will contain a frame displacement factor or will force displacement values of 0 or 4. The three 8-bit displacement registers are shown as DSP1, DSP2, and ALU DSP in the drawing. Displacement values of 0 or 4 are commanded over input lines 124 or 126 respectively. DSP1 and/or DSP2 are loaded with 8-bit displacement factors from the read next instruction circuits over input line 112 in much the same manner as were address selection registers R1 and R2. ALU DSP is loaded with an 8-bit displacement factor from the ALU via the CPU bus 100. DSP1 and DSP2 are the most often used sources, while ALU DSP is provided in conjunction with ALUR discussed previously as a displacement source for instructions implicitly referencing a base address. The output of the displacement source is preprocessed by a shifter 36 and/or an adder 44 which will be described in more detail below. This displacement can also be forced to 0. This "forced to 0" is commanded by one of the three command bits in the firmware word. When this bit is a 1, the output of the selection circuits, the 4-to-1 multiplexing circuits found in displacement select block 34 are inhibited, effectively causing all 0's to be sent to the length processing address, adder 44.

In conjunction with the displacement selection, the hardware uses the lower three bits of the selected displacement to create a displacement bit mask 38 which is an external input to the ALU via the CPU source bus labelled 104 in the drawing. This mask is generally used in bit operand operations and consists of 32 bits, the lower 8 of which are significant. Bits 31–8 are always 1's. The lower three bits of the selected displacement are used to address one of the 8 bits (0–7) of the mask, which bit is reset to 0, while the other seven default to 1's. The bit mask can then be used in an ALU logical operation, for example, to isolate the addressed bit in the byte; it can also be used to set or clear individual bits.

The following remarks deal with the displacement shifting process. The selected displacement factor, an 8-bit number, can be sent to the multiplexing circuits in three forms: "as is"; shifted 1 bit left; and shifted 3 bits right. The "as is" form indicates that the operand is one byte in length. It should be noted at this point that because the displacement value is embodied in 8 bits, a 1 byte operand must be located within the first 256 bytes of the frame in order to be uniquely identified by the displacement number. However, this restriction can be circumvented by having the base address point to a byte other than the frame's first byte. The 1 bit left form indicates that the operand is either 2, 4, or 6 bytes in length. This is because shifting 1 bit of the displacement effectively doubles its value since the 0 bit is now forced to 0 while a new bit in the 8 position is created. By this shift a $2^9$ capability is introduced which can access the entire 512 byte frame. The 3 bits right shift form is used when the software instruction is such that the operand consists of a single bit. Because the displacement value is embodied in 8 bits, a 1-bit operand must be located within the first 256 bits; that is, the first 32 bytes of the frame. However, as above, this restriction can be circumvented by having the base address point to a byte other than the frame's first byte. Shifting right 3 bits of the displacement effectively divides its value by 8. Control of the shifting process may be assumed either by 2 bits of the firmware word or may be implicitly controlled by reference to a specific field of the current software instruction. A selection between the two is controlled by a single bit of the command firmware word. The output of the displacement shift control circuits in block 36 contains the shifted displacement and is sent to the preadder in the adder block 44.

The preadder section of the adder block 44 adds one of four constants to the supplied displacement factor. The four constants are: add 0 (+0); add 2 (+2); add 4 (+4); and subtract 4 (−4). The add 0 constant function adds 0 to the displacement factor and results in no alterations to the displacement factor. This is the function most commonly performed by the preadder when the operand is a standard length operand of 1, 2, 3 or 4 bytes. The add 2 constant function adds 2 bytes to the displacement factor. This function used for a 6-byte operand. It serves to access the 4 least significant bytes first, followed by a subsequent accessing of the remaining 2 bytes. This is necessary because the ALU handles 32-bit, 4-byte words maximum in the SEQUEL system. The add 4 constant function adds 4 bytes to this displacement factor. This function is used when scanning multi-byte character strings for the presence of a particular predetermined character. It serves to access successive 4-byte segments of a multi-byte character string in the forward (ascending address) direction. The subtract 4 constant function subtracts 4 bytes from the displacement factor. This function is used when scanning multi-byte character strings. It serves to access successive 4-byte segments of a multi-byte character string in the reverse (descending address) direction.

The operation of the preadder is controlled by 3 bits of the firmware word latched into the instruction register. A first bit specifies whether the preadder control is to be explicitly determined by the two other bits of the firmware word or is to be implicitly controlled by a reference to the KK field of the current software instruction. This field is a 2-bit field which will contain one of the length indicators. A separate firmware bit controls the addition of 1 (+1) to the adder independent of the constants added by the preadder. The constants are input to the adder 44 over input line 130. Block 44 represents the combination of both the preadder and the adder functions of the address computation system. The adder itself combines the output of the preadder with the lower 9 bits of the base address from the address register file 14 yielding the lower 9 bits of the memory address. The upper 15 bits from upper bits register files 12 are not modified by address computation, since an address computation operation spans only one frame in memory (512 or $2^9$). For hardware design convenience in the SEQUEL system, bits 0–11 of the address value are written back into the address register file whenever it is selected as a destination over line 137 from the adder 44. The remaining bits (12–23) are only loaded from the CPU destination bus 100. The output of the adder 44 (bits 0–8) and the rest of the address (bits 9–23) go to the CPU destination bus drivers found in block 62 to load two hardware address registers labelled in the figure as HAR 150 and HAR 252. These two hardware address registers are the destinations of the address computation operation. The main memory address from the displacement adder is also sent to the frame error detection circuits found in block 46. In conjunction with the implicit field found in the software instruction discussed above, a carry-bit (when generated) from the displacement adder, these circuits produce a frame error flag whenever the main memory address is outside of the current frame. That is, whenever the address is higher or lower than the 512 main memory locations contained in the current frame, the frame error flag will be set and input to the microsequencer branch selection block 60.

Selection of the destination or destinations for the computed main memory address is controlled by three more bits in the firmware word latched onto the instruction register. These 3 bits enable three possibilities which include the various combinations of: no destination, HAR1 alone, HAR2 alone, HAR1 and HAR2, the address register file 10, the address register file and HAR1, the address register file and HAR2, and the address register file and HAR1 and HAR2. When one of the selections is made involving the address register file, it must be remember that the computed address will be written back into the same address register file register from which the base address was extracted. Only bits 0–11 will be written back into the address register file register. Referring to the drawing, block 51 controls the memory address drivers for HAR1, block 53 controls the memory address drivers for HAR2, with both block 51 and 53 feeding onto the memory address bus 102. Block 54 is the selection multiplexer for HAR1 or HAR2 and the driver for the CPU source bus 104. When the computer main memory addresses are written back into the address register files 10, they will be output from block 54 over the CPU source bus 104 via the ALU, not shown, and thence to the CPU destination bus 100, and from there into the address register files 10.

The address computation flags are an important adjunct to the address computation process of this invention. The address register files consist of 16 24-bit address registers. Associated with each of these registers, that is, with the addresses contained within them, is a group of four flags. These flags are maintained in a register file consisting of 16 4-bit flag registers found in the drawing as block 20. Whenever an address computation is commanded involving an address register file register, that register's corresponding flag register contents are automatically read, and passed through the flag processing circuits, and returned, altered or unaltered, to the same register in the flag register file. Also, these flags can be accessed, that is, passed through the flags' processing circuits independently of formal address computation operation by "no-op"-ing the address computation part of the command. While in the flags' processing circuits, the address flags can be left unaltered, set/reset individually or as a group (set/clear flags control), and/or forwarded on for testing (HAR1 flags). When the flags themselves are set, they have one of the three following meanings.

A 0 indicates an attached condition; that is, the corresponding address register file register contents are a main memory address. A 1 indicates a linked position with the corresponding register file register contents being an address in a linked frame. A 2 indicates a write-required condition wherein the corresponding address register file register contents are an address in a frame in main memory that must be written back to disk. That is, a disk file update is required before the main memory space occupied by the frame can be released.

Flags processing is accomplished as a part of the address computation operations. Selection of the appropriate flags register (FL0-FL15) is coupled to the selection of the address register (AR0-AR15). For example, if AR7 is referenced for an address computation operation, then FL7 is implicitly selected for any required flags processing. Manipulation of the selected set of flags then is implicitly controlled by 4 firmware bits. The first 2 bits in the instruction register direct the setting/resetting of the flags. The four-bit patterns possible in these first 2 bits are: no-op (the return flags are unaltered); clear (all flags are reset to 0); set (the specified flag is set to 1); and reset (the specified flag is reset to 0).

The second 2 bits of this 4-bit control set are used to specify a particular flag when the set or reset control is indicated by the first 2 bits. The particular active flag may be, as above, either attached, linked, or write required. Another bit in the firmware instruction latched onto the instruction register controls a 2-to-1 flag file input multiplexer. This multiplexer usually passes a processed flag set from their control circuits back to the flags register file register 20 to a different register, that is, different from the one from which it was read, on a subsequent instruction cycle. For the instruction accessing the flag set, the flag register is specified by reference to the address register file selection in the address computation operation part of the instruction. For the instruction returning the flag set to a different flag register, the address computation operation is "no-op"-ed except for the reference to the address register whose corresponding flag's register is to receive the flag set. When a flag's register is accessed, it is sent to two of the three available places: the set/clear control circuits and either the HAR1 XFLG0-3 or NOT HAR1 register RFLG0-3 as determined by that part of the associated address computations operations dealing with the destination selection. Specifically, only NOT HAR1 is loaded when 1 bit of the address computation destination selected bits (3 specific bits in the firmware instruction) is 0, and only HAR1 is loaded when the bit is 1.

Figure 2:
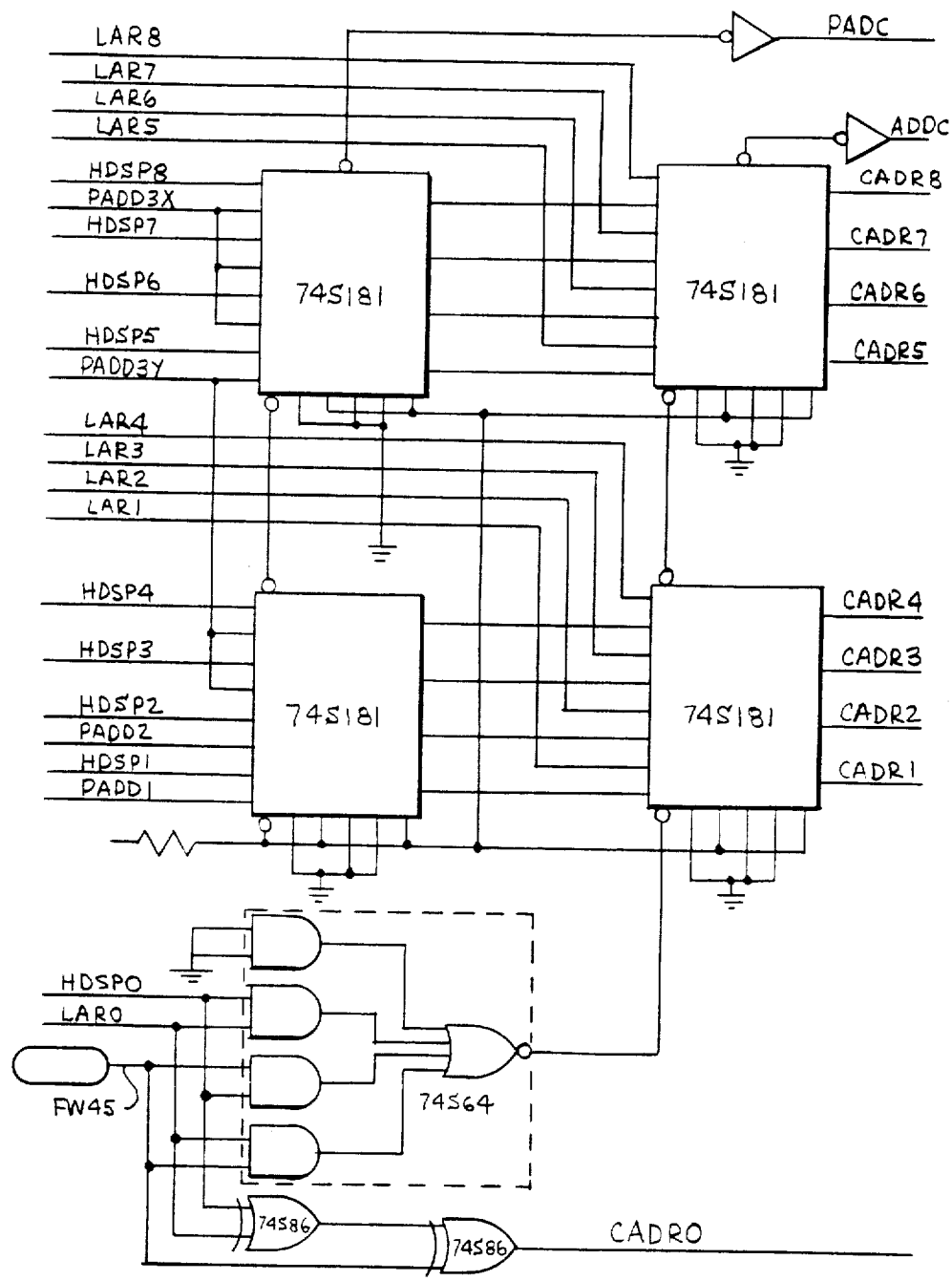
FIG. 2 is a detailed schematic diagram of the adder-preadder portion of the system.

FIG. 2 is a detailed schematic diagram of block 44 of FIG. 1 showing the preadder and adder section of the system. The inputs to the block are found along the left edge of the figure and are LAR0-7 which originate from the latch block 40 of FIG. 1 over line 134 from FIG. 1. The HDSP0-8 originate from in the displacement shifter block 36 of FIG. 1 and are carried over line 144 of FIG. 1. FIG. 1 also shows an input line 130 into the preadder-adder block 140 which carries control logic information into the block. These lines are shown in FIG. 2 as FW45, PADD1, 2, 3Y, and 3X. This input information is processed by the various chips shown in FIG. 2 and is output as the CADR0-8 lines which are output over lines 137 and 138 in FIG. 1. The PADC and ADDC lines of FIG. 2 are also output over line 138 of FIG. 1 to the end frame detector block 46 of FIG. 1.

Figure 3:
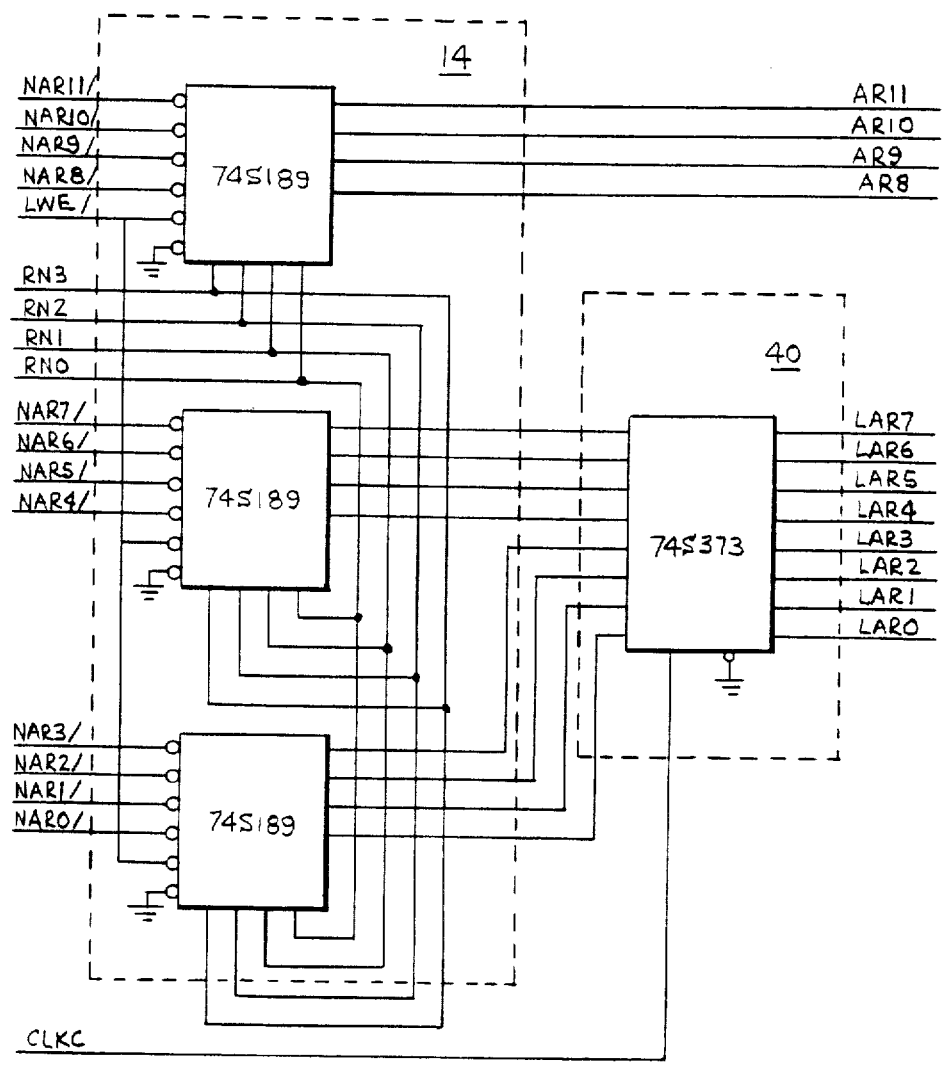
FIG. 3 is a detailed schematic drawing of the upper portion the address register files.

FIG. 3 shows the lower portion of the address register files shown in block 10 of FIG. 1, as well as a portion of the latch block 40, shown also in FIG. 1. The three chips in the address register file block 10 have as their inputs lines NAR0-11 which originate from the lower address source select block shown as block 16 in FIG. 1 via line 154 in FIG. 1. Other inputs are the RN0-3 lines which originate in blocks 20 and 30 of FIG. 1 via line 156; these are the address register file address selector blocks. The output of block 10 is lines AR8-11 which enter into another part of the latch block 40, not shown in FIG. 3, over line 158 in FIG. 1. FIG. 3 also shows a portion of the latch block 40. In this portion the inputs all come directly from the lower portion of the address register shown in this file. The outputs are lines LAR-0-7 which are conducted to the preadder-adder block 44 shown in FIG. 1 over line 134, shown in FIG. 1. The LWE line is a control input line from the computer system which is a lower address register file write enable line.

Figure 4:
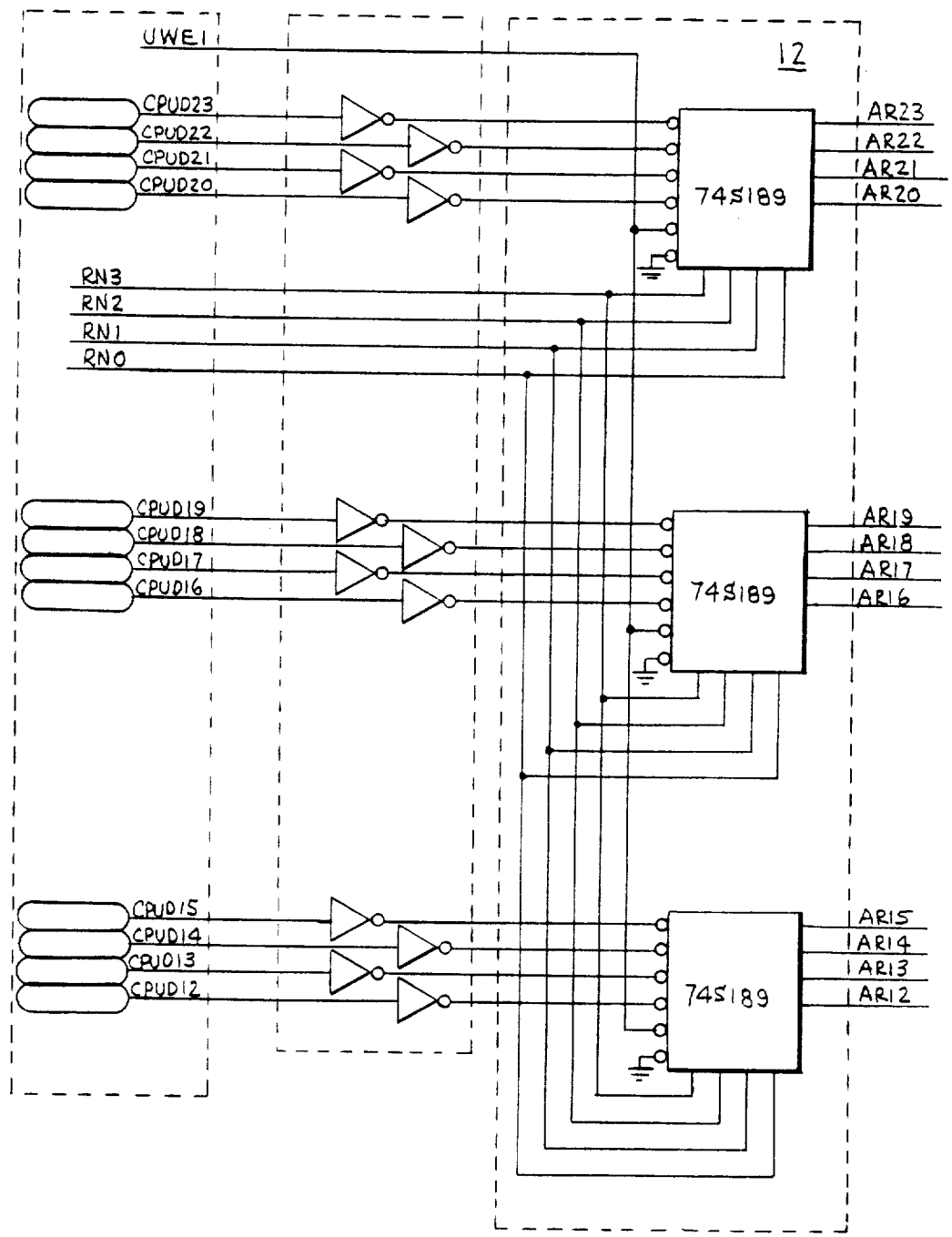
FIG. 4 is a detailed schematic drawing of the lower portion of the address register files.

FIG. 4 shows the remainder of the address register file block 10; that is the portion that handles bits 12-23 from the basic input to the overall system, the CPU destination bus. The three chips in this portion have as their inputs the CPU destination bus lines CPUD 12-23, the four input lines, RN00-3 from the 20 and 30 blocks from FIG. 1, and an upper address register file write enable input line from the system control logic, not shown in FIG. 1. The output from this portion of the address register files goes directly to the CPU destination bus driver found in block 62 of FIG. 1. These outputs are shown in FIG. 4 as lines AR12-23 and in FIG. 1 as line 101.

Figure 5:
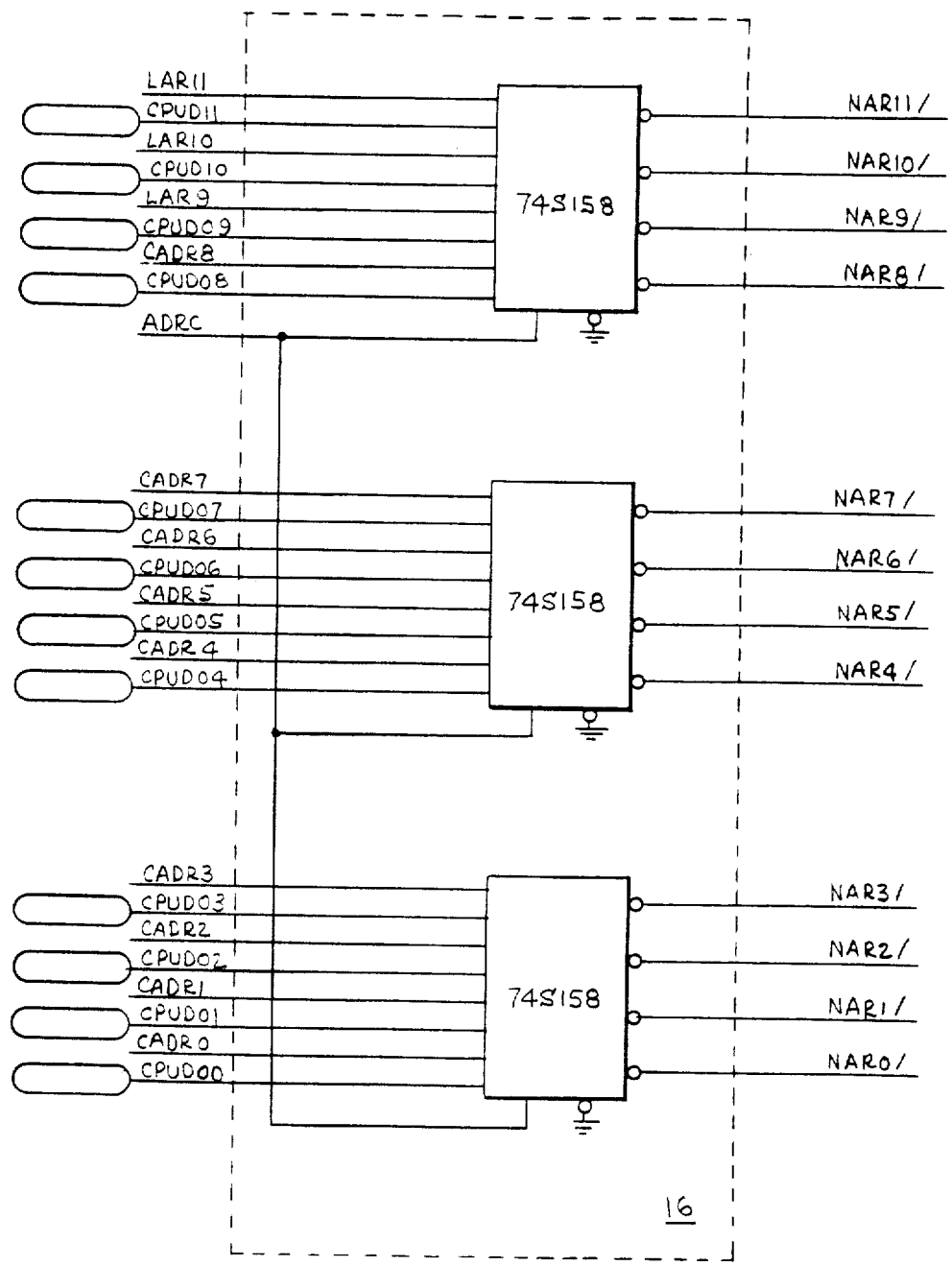
FIG. 5 is a detailed schematic drawing of the lower address source selector portion of the system.

FIG. 5 shows a detailed schematic layout for the lower address source select block 16 shown in FIG. 1. The three chips have as their inputs the CPU destination bus, lines CPUD00-11, lines CADR0-8 which originate in block 44 via line 137 in FIG. 1, lines LAR-9-11 which originate in the upper portion of latch 40, not shown in FIG. 3, which in turn originate from the AR9-11 output lines of FIG. 3 via line 136 of FIG. 1. The final input into this block is the ADRC which is the basic address computation command from the computer system. The outputs from this block are lines NAR0-11 which all go to block 14 shown in FIGS. 1 and 3.

Figure 6:
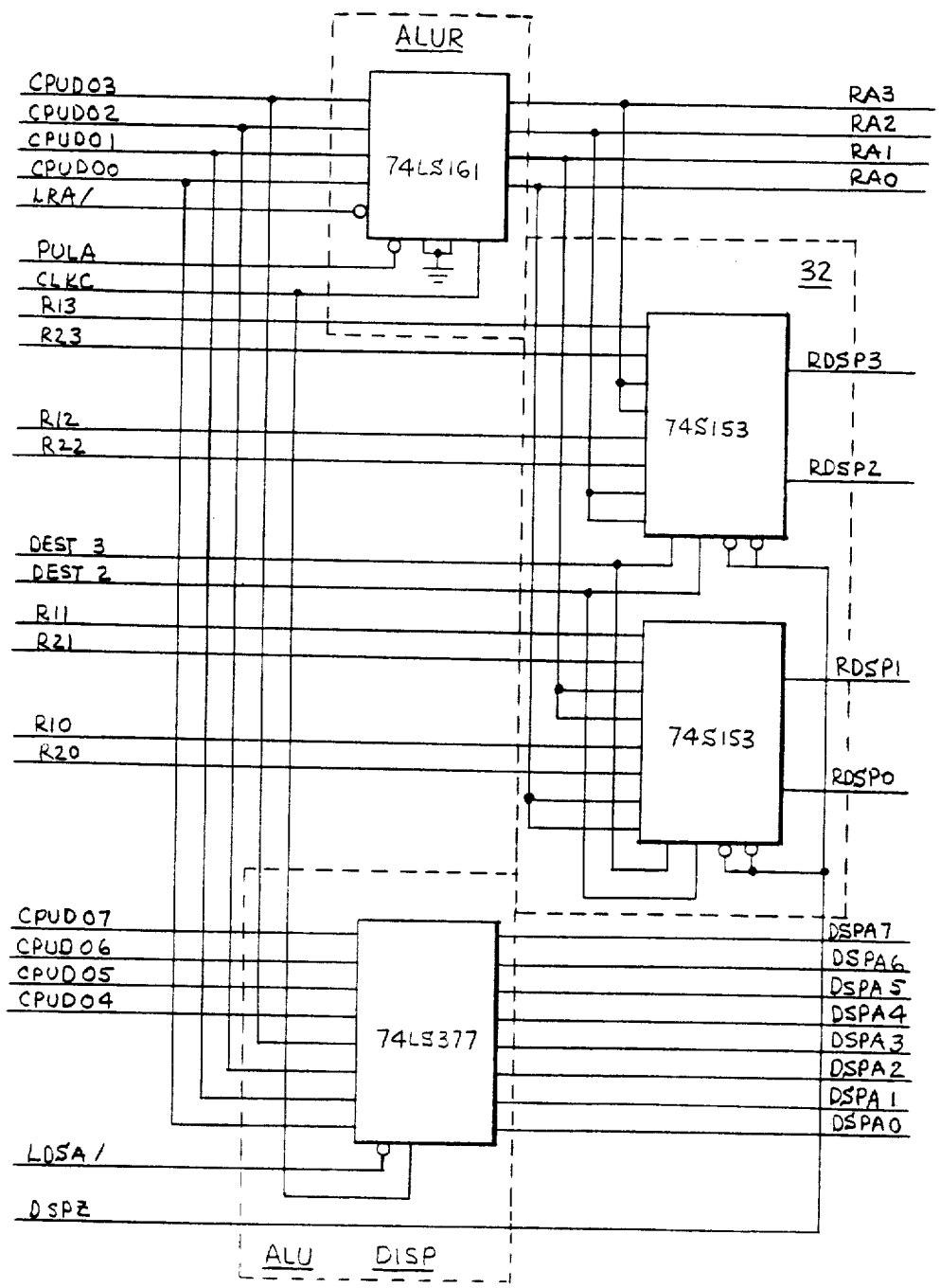
FIG. 6 displays the address register selection input from the ALU, the displacement register from the ALU, and the displacement register selection portions of the system.

FIG. 6 shows three separate blocks shown in FIG. 1, ALUR, ALU DSP, and the register displacement selector block 32. The ALUR block has as its inputs the lower most four bits of the CPU destination bus, CPUD 00-03. Other inputs include line LRA which is a load enable line from the ALU, PULA, which is an output from the bit mask decode block 38 of FIG. 1 which enters the ALURU over line 103 shown in FIG. 1, and CLKC, which is a clock line. The outputs for the ALUR block are lines RA0-3 which are conducted to address register file address selector block 30 over line 120 shown in FIG. 1. The ALU DSP block shares as its inputs the CPUD 00-03 lines with the ALUR block as well as CPU destination bus lines CPUD 04-07. Other inputs include LDSA which is a load enable signal from the ALU and the common clock line with the ALUR block, CLKC. The output of the ALU DSP block is conducted to the displacement selector block 34 over line 122 as shown in FIG. 1. These lines are DSPA0-7 in FIG. 6. The final section of FIG. 6 is the register displacement selector block 32. The two chips in this block has as their inputs the lines from the R1 and R2 blocks in FIG. 1, R10, 11, 12, 13, 20, 21, 22, and 23. Other inputs include lines RA0-3 from the ALUR block and lines DEST 2 and 3 which are control lines from the instruction register which determine which of the displacement registers will be selected.

Figure 7:
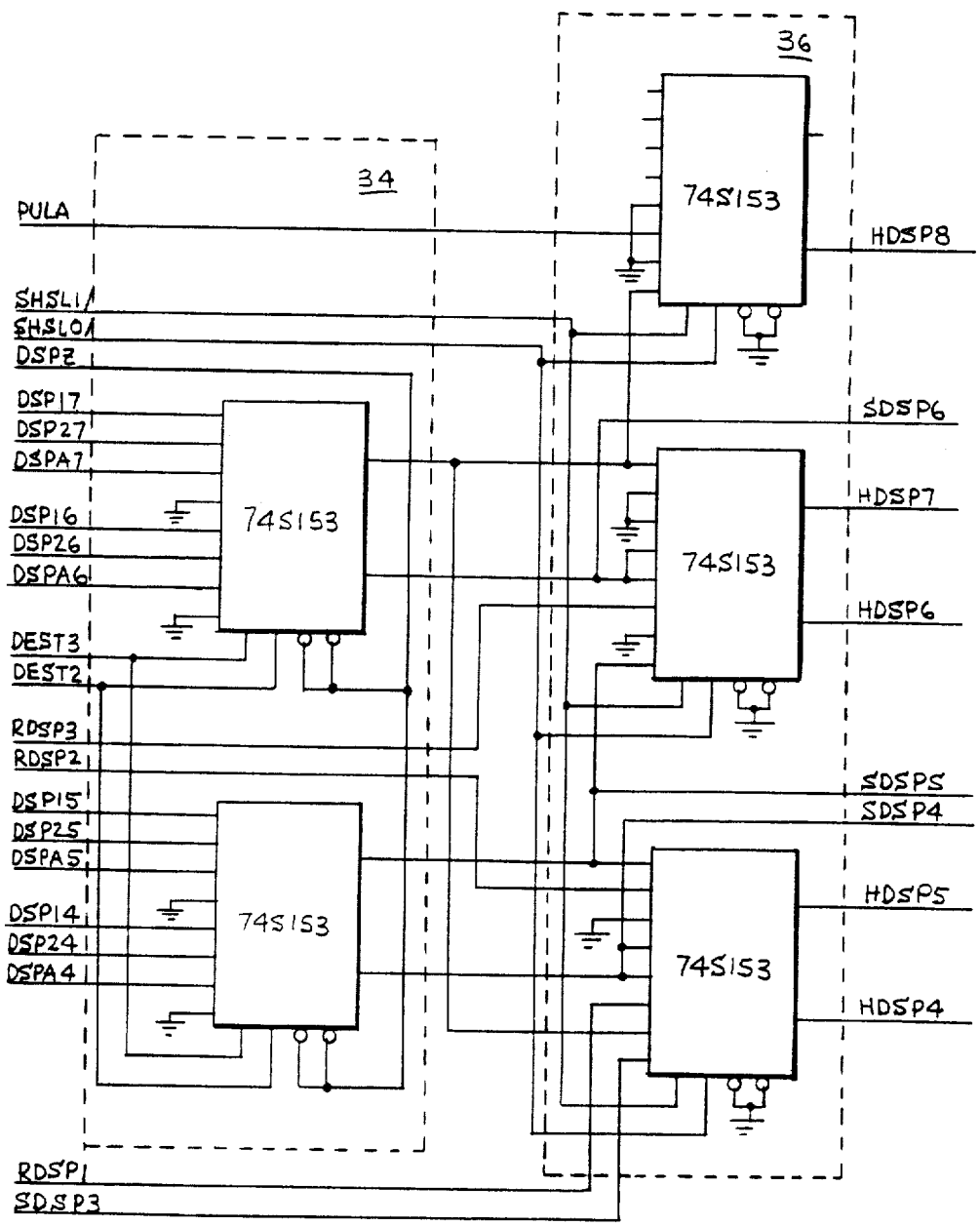
FIGS. 7 and 8 are respectively the upper and lower portions of the detailed schematic diagrams for the displacement selector and displacement shifter portions of the system.
Figure 8:
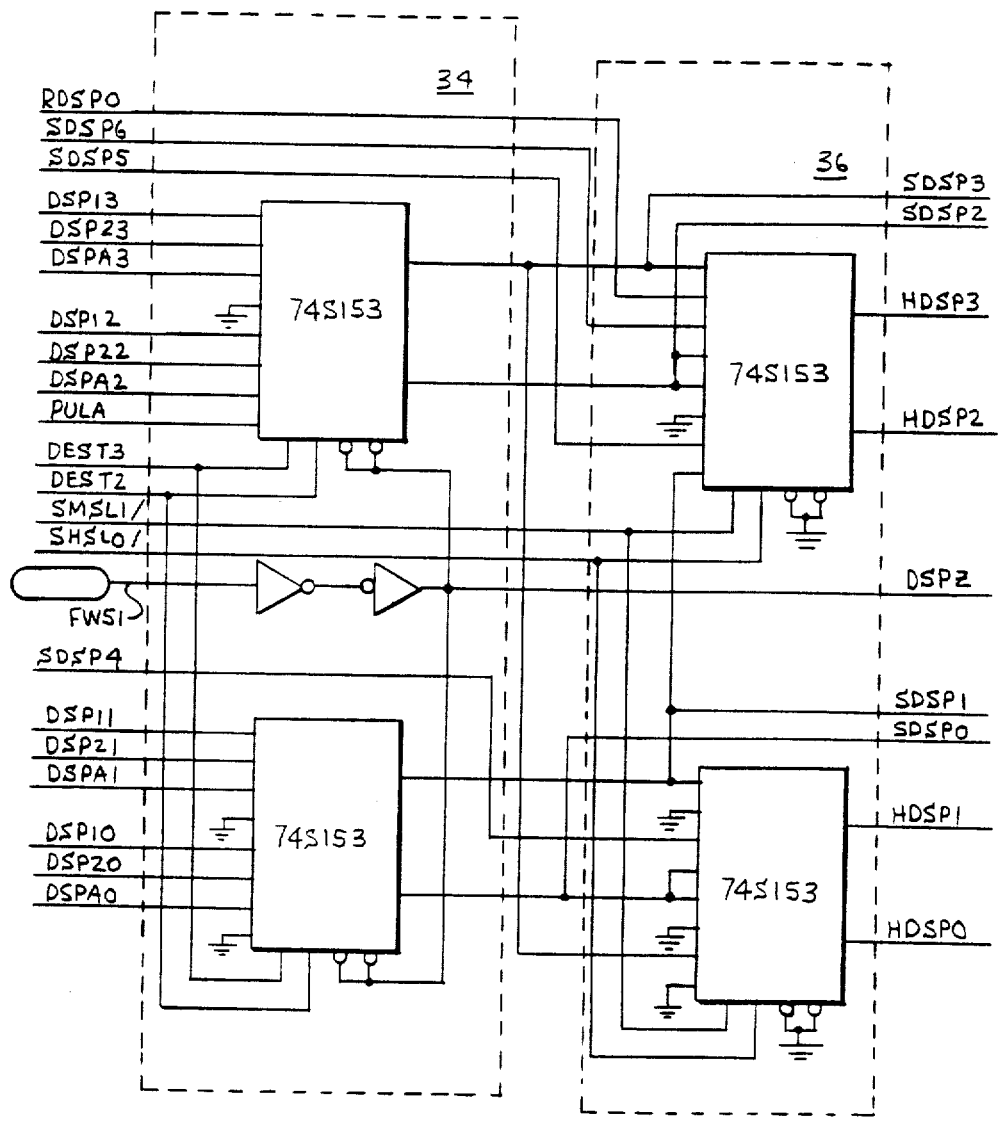

FIGS. 7 and 8 show the upper and lower portions of the displacement selector blocks 34 and the displacement shifter blocks 36. The various inputs and outputs to the chips in these blocks will be discussed together since many are shared commonly. The PULA input to the 34 blocks in FIGS. 7 and 8 is from the bit mask decoder block 38 shown at FIG. 1. The SHSL 0-1 lines are shift control terms from the firmware command. The DSP Z (FW 51) is a firmware command line which, if a 1 forces the displacement to a 0 value. The lines DSP1 0-7 and DSP2 0-7 are the displacement data input lines from the DSP 1 and DSP 2 blocks shown in FIG. 1. Lines DSPA 0-7 are also displacement data input lines which originate in the ALU DSP block shown in FIGS. 1 and 6. The DEST 2, 3 lines have been discussed above. The RDSP 0-3 lines originate in the register displacement selector block 32 shown in FIG. 6. The SDSP 0-2 lines are output lines to the bit mask decoder block 38, with SP 3-6 lines being internal lines between FIGS. 7 and 8 which; input into the lower displacement block 36 shown in FIG. 8. The HDSP 0-8 lines are the output lines from the displacement shifter block 36 which are passed on to the preadder-adder block 44 via line 144 as shown in FIG. 1.

What is claimed is:

1. An address computation (ADC) system for use in a computer system for determining an absolute main memory address of an operand stored in main memory wherein the initial address of the operand is defined in terms of a base address, a displacement from the base address and a constant comprising:

initial address input means to supply the ADC with the initial address originating from a direct software instruction from the computer system arithmetic logic unit (ALU) and a firmware word latched onto an instruction register in the ALU;

address register means for storing the base address of the operand;

displacement register means for storing the initial displacement for the operand received from the firmware word;

adder means for combining the constant received from the firmware word and the displacement with the base address to produce the absolute main memory address; and output means to supply the absolute main memory address to memory address bus means in the computer system via at least one of two separate, selectable hardware address registers.

2. The ADC system of claim 1 wherein the address register means comprises a plurality of individual address registers, each of which has a unique identifying label and contains a main memory address for an operand, and address register selector means under the control of a command instruction from the firmware word for the selection of an individual address register.

3. The ADC system of claim 1 wherein the displacement register means comprise a plurality of individual displacement registers containing displacement information, the selection of which are controlled by displacement selector means, the output of a register being acted upon by a further displacement shifter means under the control of the firmware word capable of directing shifted displacements of two, one, and one eigth times the initial displacement.

4. The ADC system of claim 3 wherein the adder means further comprises preadder means which combines the shifted displacement with the constant such that 0, +2, +4, or −4 constant bytes are added to the shifted displacement as directed by the firmware word.

5. The system of claim 1 further comprising end of frame detector means which provide a signal to the computer system if the absolute main memory address defines an address outside the memory frame which contains the initial base address.

* * * * *